United States Patent
Decasper et al.

(10) Patent No.: US 8,903,950 B2
(45) Date of Patent: *Dec. 2, 2014

(54) PERSONALIZED CONTENT DELIVERY USING PEER-TO-PEER PRECACHING

(75) Inventors: Dan Decasper, San Mateo, CA (US); Zubin Dittia, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1358 days.

This patent is subject to a terminal disclaimer.

(21) Appl. No.: 11/737,425

(22) Filed: Apr. 19, 2007

(65) Prior Publication Data

US 2007/0192474 A1 Aug. 16, 2007

Related U.S. Application Data

(63) Continuation of application No. 09/660,991, filed on Sep. 13, 2000, now abandoned, which is a continuation-in-part of application No. 09/566,068, filed on May 5, 2000, now Pat. No. 6,917,960.

(51) Int. Cl.
*G06F 15/16* (2006.01)
*H04L 29/08* (2006.01)

(52) U.S. Cl.
CPC .......... *H04L 67/2814* (2013.01); *H01L 67/306* (2013.01)
USPC ....................................... 709/219

(58) Field of Classification Search
CPC .......... G06F 12/0862; G06F 17/30867; G06F 17/30902; H04L 65/4084; H04L 67/02; H04L 67/2842; H04L 67/2847; H04L 67/289; H04L 67/306; H04L 69/329
USPC ................................... 709/213–219
See application file for complete search history.

(56) References Cited

U.S. PATENT DOCUMENTS

| | | | |
|---|---|---|---|
| 5,754,939 A * | 5/1998 | Herz et al. | 455/3.04 |
| 5,761,662 A * | 6/1998 | Dasan | 707/10 |
| 5,768,528 A | 6/1998 | Stumm | |
| 5,862,325 A | 1/1999 | Reed et al. | |
| 5,870,559 A | 2/1999 | Leshem et al. | |
| 5,920,701 A * | 7/1999 | Miller et al. | 709/228 |
| 5,958,008 A | 9/1999 | Pogrebisky et al. | |
| 5,974,572 A | 10/1999 | Weinberg et al. | |
| 5,991,306 A * | 11/1999 | Burns et al. | 370/429 |
| 5,999,179 A | 12/1999 | Kekic et al. | |
| 6,038,601 A * | 3/2000 | Lambert et al. | 709/226 |
| 6,052,730 A | 4/2000 | Felciano et al. | |
| 6,076,109 A | 6/2000 | Kikinis | |
| 6,081,840 A * | 6/2000 | Zhao | 709/224 |

(Continued)

OTHER PUBLICATIONS

Eric M. Schurman et al., Dynamic HTML in Action Web Technology, Second Edition, Microsoft Press, 1999, pp. 5-6,82,85-89.

(Continued)

*Primary Examiner* — Christopher Biagini
(74) *Attorney, Agent, or Firm* — Foley & Lardner LLP; Christopher J. McKenna

(57) ABSTRACT

A method and apparatus for peer-to-peer video precaching is described. In one embodiment, the method comprises building a user profile, periodically checking for new content of objects in the user profile, maintaining a data base of available objects and location of said objects, and determining the download location of an object requested by a user.

35 Claims, 7 Drawing Sheets

Initiating Downloads Directly from Server

(56) References Cited

U.S. PATENT DOCUMENTS

| | | | |
|---|---|---|---|
| 6,088,717 A | 7/2000 | Reed et al. | |
| 6,138,141 A | 10/2000 | DeSimone et al. | |
| 6,144,962 A | 11/2000 | Weinberg et al. | |
| 6,145,003 A * | 11/2000 | Sanu et al. | 709/225 |
| 6,230,205 B1 * | 5/2001 | Garrity et al. | 709/231 |
| 6,237,006 B1 | 5/2001 | Weinberg et al. | |
| 6,272,537 B1 | 8/2001 | Kekic et al. | |
| 6,285,985 B1 * | 9/2001 | Horstmann | 705/14 |
| 6,292,835 B1 * | 9/2001 | Huang et al. | 709/235 |
| 6,317,761 B1 | 11/2001 | Landsman et al. | |
| 6,341,310 B1 | 1/2002 | Leshem et al. | |
| 6,345,288 B1 | 2/2002 | Reed et al. | |
| 6,366,907 B1 * | 4/2002 | Fanning et al. | 707/3 |
| 6,366,933 B1 | 4/2002 | Ball | |
| 6,389,469 B1 * | 5/2002 | Vekslar et al. | 709/226 |
| 6,449,627 B1 | 9/2002 | Baer et al. | |
| 6,470,383 B1 | 10/2002 | Leshem et al. | |
| 6,473,794 B1 | 10/2002 | Guheen et al. | |
| 6,490,587 B2 | 12/2002 | Easty | |
| 6,519,571 B1 | 2/2003 | Guheen et al. | |
| 6,523,027 B1 | 2/2003 | Underwood | |
| 6,536,037 B1 | 3/2003 | Guheen et al. | |
| 6,549,944 B1 | 4/2003 | Weinberg et al. | |
| 6,553,129 B1 | 4/2003 | Rhoads | |
| 6,560,639 B1 | 5/2003 | Dan et al. | |
| 6,606,744 B1 | 8/2003 | Mikurak | |
| 6,611,840 B1 | 8/2003 | Baer et al. | |
| 6,615,166 B1 | 9/2003 | Guheen et al. | |
| 6,622,168 B1 | 9/2003 | Datta | |
| 6,658,000 B1 | 12/2003 | Raciborski et al. | |
| 6,658,464 B2 * | 12/2003 | Reisman | 709/219 |
| 6,664,978 B1 | 12/2003 | Kekic et al. | |
| 6,671,818 B1 | 12/2003 | Mikurak | |
| 6,721,713 B1 | 4/2004 | Guheen et al. | |
| 6,728,000 B1 | 4/2004 | Lapstun et al. | |
| 6,757,710 B2 | 6/2004 | Reed | |
| 6,766,944 B2 | 7/2004 | Silverbrook et al. | |
| 6,766,945 B2 | 7/2004 | Kia et al. | |
| 6,788,315 B1 | 9/2004 | Kekic et al. | |
| 6,789,731 B2 | 9/2004 | Kia et al. | |
| 6,813,039 B1 | 11/2004 | Silverbrook et al. | |
| 6,825,945 B1 | 11/2004 | Silverbrook et al. | |
| 6,825,956 B2 | 11/2004 | Silverbrook et al. | |
| 6,832,717 B1 | 12/2004 | Silverbrook et al. | |
| 6,836,806 B1 | 12/2004 | Raciborski et al. | |
| 6,839,701 B1 | 1/2005 | Baer et al. | |
| 6,843,420 B2 | 1/2005 | Paul et al. | |
| 6,862,105 B2 | 3/2005 | Silverbrook et al. | |
| 6,880,123 B1 | 4/2005 | Landsman et al. | |
| 6,901,595 B2 | 5/2005 | Mukundan et al. | |
| 6,907,451 B1 | 6/2005 | Mukundan et al. | |
| 6,957,186 B1 | 10/2005 | Guheen et al. | |
| 6,972,864 B2 | 12/2005 | Lapstun et al. | |
| 6,976,090 B2 | 12/2005 | Ben-Shaul et al. | |
| 6,980,318 B1 | 12/2005 | Silverbrook et al. | |
| 6,980,962 B1 | 12/2005 | Arganbright et al. | |
| 6,983,878 B2 | 1/2006 | Silverbrook et al. | |
| 6,986,102 B1 | 1/2006 | Baer et al. | |
| 6,987,506 B1 | 1/2006 | Lapstun et al. | |
| 6,988,126 B2 | 1/2006 | Wilcock et al. | |
| 6,996,274 B2 | 2/2006 | Lapstun et al. | |
| 6,996,605 B2 | 2/2006 | Low et al. | |
| 7,000,019 B2 | 2/2006 | Low et al. | |
| 7,007,034 B1 | 2/2006 | Hartman, Jr. et al. | |
| 7,009,738 B2 | 3/2006 | Silverbrook et al. | |
| 7,012,710 B2 | 3/2006 | Lapstun et al. | |
| 7,013,290 B2 | 3/2006 | Ananian et al. | |
| 7,017,823 B2 | 3/2006 | Lapstun et al. | |
| 7,025,276 B2 | 4/2006 | Lapstun et al. | |
| 7,031,010 B2 | 4/2006 | Lapstun et al. | |
| 7,035,907 B1 | 4/2006 | Decasper et al. | |
| 7,038,797 B1 | 5/2006 | Lapstun et al. | |
| 7,043,488 B1 | 5/2006 | Baer et al. | |
| 7,055,739 B1 | 6/2006 | Lapstun et al. | |
| 7,057,608 B2 | 6/2006 | Paul et al. | |
| 7,068,382 B1 | 6/2006 | Silverbrook et al. | |
| 7,070,098 B1 | 7/2006 | Lapstun et al. | |
| 7,076,494 B1 | 7/2006 | Baer et al. | |
| 7,077,333 B2 | 7/2006 | Silverbrook et al. | |
| 7,079,712 B1 | 7/2006 | Silverbrook et al. | |
| 7,080,780 B2 | 7/2006 | Silverbrook et al. | |
| 7,089,239 B1 | 8/2006 | Baer et al. | |
| 7,123,239 B1 | 10/2006 | Lapstun et al. | |
| 7,124,101 B1 | 10/2006 | Mikurak | |
| 7,130,807 B1 | 10/2006 | Mikurak | |
| 7,134,598 B2 | 11/2006 | Silverbrook et al. | |
| 7,134,601 B2 | 11/2006 | Silverbrook et al. | |
| 7,146,617 B2 | 12/2006 | Mukundan et al. | |
| 7,149,698 B2 | 12/2006 | Guheen et al. | |
| 7,150,396 B2 | 12/2006 | Silverbrook et al. | |
| 7,154,638 B1 | 12/2006 | Lapstun et al. | |
| 7,155,243 B2 | 12/2006 | Baldwin et al. | |
| 7,162,088 B2 | 1/2007 | Lapstun et al. | |
| 7,165,041 B1 | 1/2007 | Guheen et al. | |
| 7,167,270 B2 | 1/2007 | Silverbrook et al. | |
| 7,173,722 B1 | 2/2007 | Lapstun et al. | |
| 7,174,056 B2 | 2/2007 | Silverbrook et al. | |
| 7,175,079 B2 | 2/2007 | Silverbrook et al. | |
| 7,203,948 B2 | 4/2007 | Mukundan et al. | |
| 7,222,098 B2 | 5/2007 | Silverbrook et al. | |
| 7,222,780 B2 | 5/2007 | Lapstun et al. | |
| 7,269,664 B2 | 9/2007 | Hutsch et al. | |
| 2002/0147805 A1 | 10/2002 | Leshem et al. | |
| 2003/0069803 A1 | 4/2003 | Pollitt | |
| 2003/0191812 A1 | 10/2003 | Agarwalla et al. | |
| 2004/0002903 A1 | 1/2004 | Stolfo et al. | |

OTHER PUBLICATIONS

Neuman et al., The Kerberos Network Authentication Service (V5), Internet draft, work in progress, Sep. 2004.

* cited by examiner

Figure 2: Discovering New Content

Figure 3: Gathering Profiles

Figure 4: Initiating Downloads Directly from Server

Figure 5: Initiating Downloads from Peers

PERSONALIZED CONTENT DELIVERY USING PEER-TO-PEER PRECACHING

RELATED APPLICATIONS

This application is a continuation of U.S. patent application Ser. No. 09/660,991, entitled "Personalized Content Delivery Using Peer-To-Peer Precaching," filed Sep. 13, 2000, which is a continuation-in-part application of U.S. patent application Ser. No. 09/566,068, entitled "Intelligent Content Precaching," filed May 5, 2000.

FIELD OF THE INVENTION

The present invention relates to the field of content precaching in a networked environment; more particularly, the present invention relates to peer-to-peer precaching content, including bandwidth intensive content.

BACKGROUND OF THE INVENTION

The World Wide Web ("web") uses the client-server model to communicate information between clients and servers. Web servers are coupled to the Internet and respond to document requests from web clients. Web clients (e.g., web "browsers") are programs that allow a user to simply access web documents located on web servers.

An example of a client-server system interconnected through the Internet may include a remote server system interconnected through the Internet to a client system. The client system may include conventional components such as a processor, a memory (e.g., RAM), a bus which coupled the processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem.

To define the addresses of resources on the Internet, Uniform Resource Locator (URL) system are used. A URL is a descriptor that specifically defines a type of Internet resource and its location. To access an initial web document, the user enters the URL for a web document into a web browser program. Then, a request is made by a client system, such as a router or other network device, and is sent out over the network to a web server. Thus, the web browser sends a request to the server that has the web document using the URL. The web server responds to the request and sends the desired content back over the network to the requester. For example, the web server responds to the http request by sending the requested object to the client. In many cases, the object is a plain text (ASCII) document containing text (in ASCII) that is written in HyperText Markup Language (HTML); however, the object may be a video clip, movie or other bandwidth intensive content.

A problem with the Internet is that it has limited bandwidth resources and different points in the Internet may experience network congestion, resulting in poor performance especially for bandwidth-intensive applications. The Internet backbone is often painfully slow. The bandwidth limitation is mainly due to one or more congested links between the web server and the client. Broadband access can help in solving the first mile problem but does not help if the congestion occurs deeper in the network.

High-quality on-demand video over the Internet has been promised for a long time now. Lately, the hype has increased due to the emerging deployment of broadband access technologies like digital subscriber line (DSL), cable modems, and fixed wireless. These technologies promise to bring full motion, TV quality video to consumers and businesses. Unfortunately, early adopters of the technology quickly discovered that they still cannot get video in any reasonable quality over the network. Certainly, broadband access improves the viewing experience—some web sites targeted to broadband connected customers provide movies with slightly higher resolution. However, the video remains as jerky and fuzzy as before, synchronization with the audio is poor, and it requires often tens of seconds of buffering before starting. Nobody would seriously consider this to be an alternative to DVD or analog TV.

Providing video over the Internet is difficult because video requires huge amounts of bandwidth, even by today's standards. MPEG4-compressed NTSC-quality video, for example, uses an average data rate of 1.2 Mbits/s, with peak rates as high as 3 Mbits/s. MPEG2/DVD quality video consumes 3.7 Mbits/s on the average, with peaks up to 8 Mbits/s.

Most of today's broadband Internet links, especially those to small to medium-sized businesses (SMBs) typically provide data rates in the 100s of Kbits/s up to 2 Mbits/s. Most residences get asynchronous digital subscriber line (ADSL) technology, which is typically provisioned at approximately 1 Mbits/s for downloads from the Internet, and 128 Kbits/s for uploads. Often access links are shared among multiple users, which further reduces the bandwidth available to an individual.

While these data rates are expected to gradually increase in the long term, another phenomenon causing bandwidth shortage will remain: overprovisioning. Typically, Internet Service Providers (ISPs) overprovision their broadband links for economic reasons by a factor of ten. This means that if all their customers would use the service simultaneously, every one of those customers would get only $\frac{1}{10}$th of the bandwidth they signed up for. While this scenario might sound unlikely, it is important to note that bandwidth will degrade during peak hours. The problem is better known from cable modems, where customers share a cable segment, but applies to all broadband access technologies.

The network backbone can also be the bottleneck. Especially backbone peering points are likely to impose low data rates, which slows down end-to-end network speed despite fast last mile technology. Even technology advances such as terabit routers, dense wave division multiplexing (DWDM), and faster transmission equipment will not help significantly if, as expected, Internet traffic continues to keep growing faster than these advances in technology.

One prior art solution to accommodate the slowness of the Internet backbone is to move content closer to individuals desiring the content. To that end, content may be cached on the carrier edge and requests for such content may be serviced from these caches, instead of the web server servicing the requests. Distributing content in this manner can require large numbers of cache memories being deployed at the carrier edge and each cache memory stores content from a number of sites. When a request is made for content from a site that has been stored in one (or more) of the cache memories that is closer (from a network proximity viewpoint) to the requester than the original website, the request is satisfied from the cache. In such a situation, the interactive experience for text and images is improved significantly only if content from the site has been stored in the cache and the individual making the request is close enough to one of the servers supporting such a cache to satisfy requests with the content stored therein. This is referred to as carrier edge caching. One provider of such a service is Akamai. Also, such an arrangement for caching content requires that the content owner and the entity caching the content enter an agreement with respect to the access for that content so that the content can be stored ahead of time. Some of the providers of a carrier edge caching service use dedicated links (e.g., via satellites) to feed web pages and embedded objects to these servers and circumvent the Internet backbone entirely. Providing carrier edge caching for high-resolution video requires a particularly large number of servers to be deployed, since the number of clients each server can handle simultaneously is very small.

While carrier edge caching takes the load off the backbone and has the potential to significantly improve the end user's experience for text and image-based content, there are two major shortcomings with this approach. First, it requires hardware infrastructure to be deployed on a giant scale. Without servers in all major ISP's point of presence (POPs) and satellite receivers in central offices (COs), caching on the carrier edge does not work effectively. To deploy and maintain this hardware infrastructure is very cost intensive. Second, the last mile access link remains the bottleneck for affordable truly high resolution video for the foreseeable future.

Thus, high-quality video-on-demand in the strongest sense of the word might be something that will not be available for a while. However, despite all these limitations, a broadband access link of 500 KBits/s can deliver more than 5 GByte of data in 24 hours, which corresponds to 8 hours of NTSC quality video, or 3 hours of DVD quality video—more than most people, especially at work, ever watch.

SUMMARY OF THE INVENTION

A method and apparatus for peer-to-peer video precaching is described. In one embodiment, the method comprises a client receiving an indication from a controller that at least one new content object corresponding to content specified in a user profile is to be downloaded, the client receiving an indication of a location of the at least one content object from the controller, and downloading the content object from the location. Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
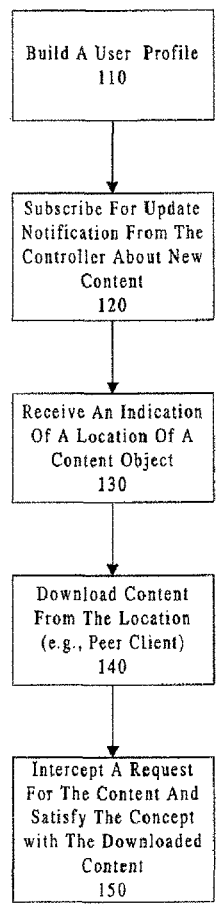
FIG. 1 illustrates a flow diagram of one embodiment of a process for precaching.

A method and apparatus for peer-to-peer content precaching is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The precaching technique described herein involves building a user profile, subscribing for update notifications for new content (e.g., objects) based on information in the user profile, downloading the new content, and intercepting user's requests for a web server to transparently return the content to the user. In order to do so, a controller maintains one or more databases of available objects and the locations of the objects. As new content becomes available, the controller searches the database of client profiles to determine the set of clients which will want a copy of the new content. The controller sends a message to each of the clients in the set to instruct them to download the content. The message contains the location from where an object may be downloaded to the client making the request. When the content has already been downloaded by a peer client, the controller may indicate to the client making the request that the peer client has the content and provides an indication to allow the requesting client to download the content from the peer client. Thus, in such a case, there is peer-to-peer precaching.

In an alternative embodiment, the controller checks for new content, in response to a request by a client, by searching one or more database(s) to determine if the content object has been already downloaded by a client in the system.

FIG. 1 is a flow diagram illustrating one embodiment of the content precaching process. The process may be performed by processing logic that comprises hardware, software, or a combination of both.

Referring to FIG. 1, the process begins with processing logic building a user profile (processing block 110). As described in more detail below, a user profile may be built by tracking user access patterns, receiving profile information from another entity, and/or being configured with a profile (or portion thereof) from a user.

Processing logic subscribes for an update of new content based on information in the user profile (processing block 120). In one embodiment, the periodic checking includes sending the requests to a controller (e.g., centralized master), which determines if there are any new content objects that correspond to content specified in the profile. Whether new content exists may be identified by querying a master controller, subscribing with the master controller, and/or crawling the networked environment. Each of these will be described in more detail below.

Processing logic receives an indication of the location of new content (processing block 130). Subsequently, processing logic downloads the new content (processing block 140) from that location. Then processing logic intercepts a user's request to a web server and transparently returns the content to the user from a local storage (e.g., cache) instead of the original web server (processing block 150).

The content comprises objects (e.g., content objects) that may include web pages, video files, audio files, source code, executable code, programs (e.g., games), archives of one or more of these types of objects, databases, etc.

In one embodiment, the clients run on a platform and maintain profiles. A client may be an end point of a network or one or multiple hops away from the end point of a network (e.g., a local area network). By forwarding its profile to the controller and having the controller indicate when to download new content objects, the client is able to obtain and precache content objects prior to requests based on profiles. The content objects are stored in a precache memory while the network access link is not used interactively.

When a web browser or other end user program makes a request for a content object, the client intercepts the request and checks to determine if it has the content object stored locally. If it is stored locally, then the client obtains the content and sends the content object to the browser or other end-user program using any inter-process communication (IPC) mechanism; in doing so, the object may simply be transferred to another task, process, or thread running on the same machine as the client, or it may travel over a local network (e.g., LAN) to a different machine that is running the browser or end-user program. If the content object is not available locally, then the client retrieves the object, or a low-quality representation of the object, over the wide area network from any server which hosts the content object.

One Embodiment of an Architecture for Content Precaching

Figure 2:
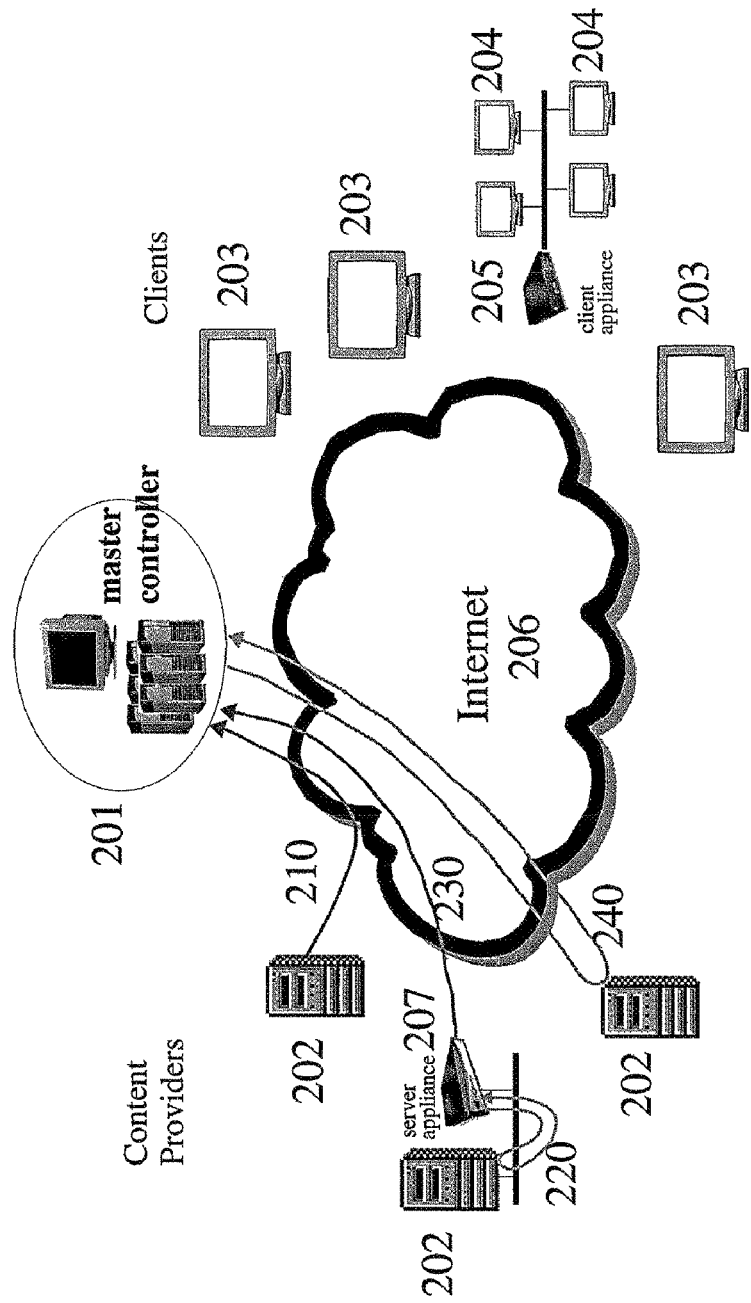
FIGS. 2, 3, 4, and 5 illustrate one embodiment of a precaching architecture.

FIGS. 2, 3, 4, and 5 illustrate one embodiment of an architecture for the content precaching described herein. Referring to FIG. 2, one or more content providers (e.g., web servers, video servers, audio servers, etc.) 202 are coupled to the Internet 206 or another networked environment. One or more clients 203 is coupled directly to Internet 206, or indirectly coupled to Internet 206 through a client appliance 205.

Clients 203 or 204 may comprise a PC, a work station, a network appliance device, a web pad, a wireless phone or other communication device, a set-top box, etc. Client appliance 205 may be implemented on a service gateway (e.g., a router, bridge, switch, other network device) in the LAN or as an end point on the LAN. Clients 203 or client appliance 205 may run software and reside in a LAN or other networked environment. In one embodiment, the precache memory is part of client 203. In another embodiment, the precache memory is part of client appliance 205, or on another client machine that is linked to client 203 by way of a LAN or some other networking subsystem.

Client 203 or client appliance 205 may be coupled to the Internet by a modem link, a digital subscriber line (DSL), cable modem, (fixed) wireless connection, fiber, etc. This coupling may be either a direct connection, or indirectly connected through a router, switch, or other similar device.

One or more clients may be peers. A peer is a "nearby" or local host, such as, for example, a host in the same LAN, a host connected to the same ISP, or any other networked device offering reasonable connectivity (e.g., bandwidth, latency). In FIG. 2, any or all of clients 203 or client appliances 205 may be in peer relationships with each other.

Master controller 201 is coupled to Internet 206 or some other networked environment. Master controller 201 is a server host or cluster of server hosts along with storage (e.g., network-attached storage, database engines), and typically resides in a controlled environment at one or a few locations strategically placed in the Internet to allow for reasonable connectivity.

Master controller 201 can discover content which becomes available at content servers 202. One way in which new content can be discovered is through direct reports 210 coming from content sewers 202. Such direct reports 210 could be generated periodically, or in response to an event on server 202 (e.g., new content being placed on the server by the server administrator). Direct reports 210 are usually generated by software running on servers 202.

Another way in which master controller 201 can discover the availability of content on content servers 202 is by use of a server appliance 207 that is colocated on the server 202's site, or close to it. Server appliance 207 can locally crawl (220) through the content on server 202 frequently to check for the availability of new content. It can then report new changes, or provide a summary of all content on server 202, by sending messages 230 to master controller 201. In this context, the server 202 need not run any special software that can communicate directly with the master controller.

A third way in which master controller 201 can discover the availability of content on content servers 202 is by directly crawling (240) the content available on content server 202. This crawling operation 240 is similar to the way in which web search engines retrieve files from an Internet web server.

Figure 3:
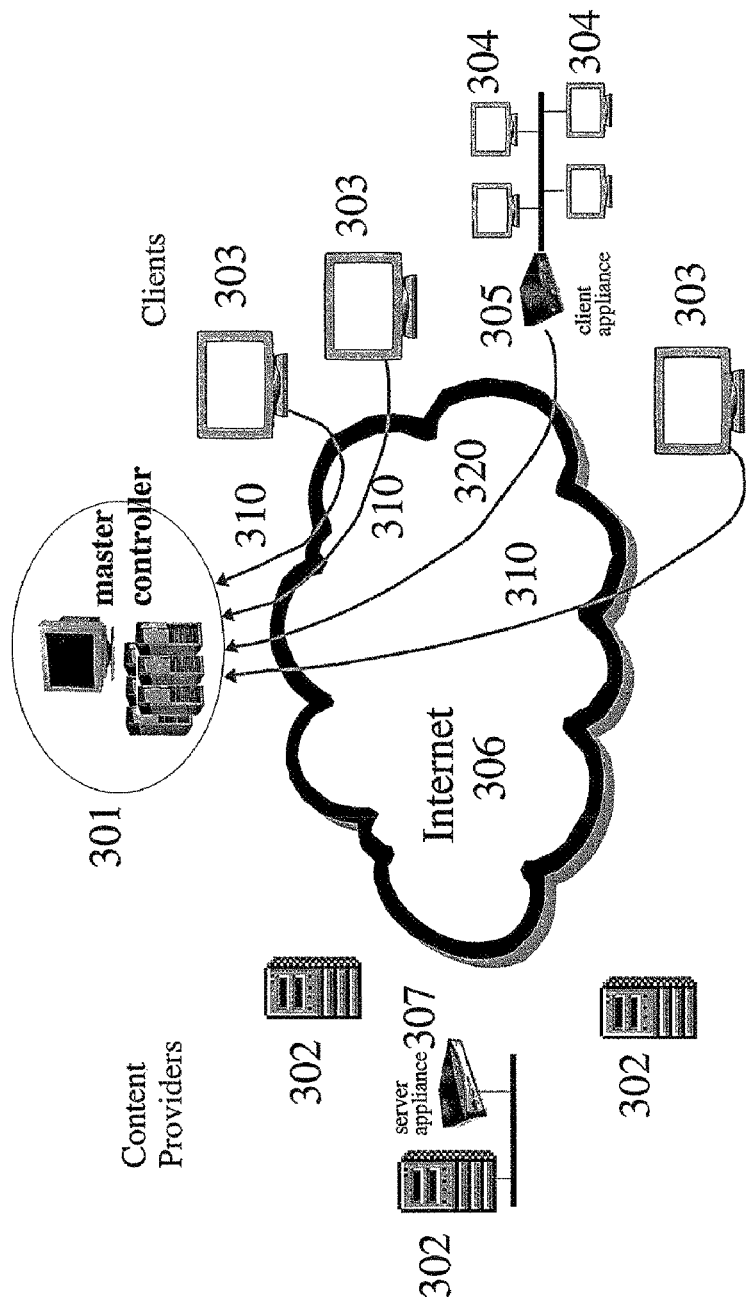

FIG. 3 is an alternative view of FIG. 2 illustrating the gathering of profiles. Referring to FIG. 3, clients 303 maintains profiles for local users. In one embodiment, the profile is built based on observing user access patterns, and from those access patterns, determining what types of content the end user will want to access in the future. In another embodiment, the profile may be built up or augmented by information provided directly by the master controller 301 or the end users or both. A local network administrator may also add to the profile.

Profiles for one or more clients 304 may also be maintained by a client appliance 305. In this case, it would not be necessary for clients 304 to run special software to collect and report profiles.

Clients 303 report on the profiles they maintain to master controller 301 using messages 310. Similarly, client appliances 305 report on the profiles they maintain to master controller 301 using messages 320. Messages 310 and 320 can be generated periodically, or in response to some event (e.g., a request from master controller 301).

Figure 4:
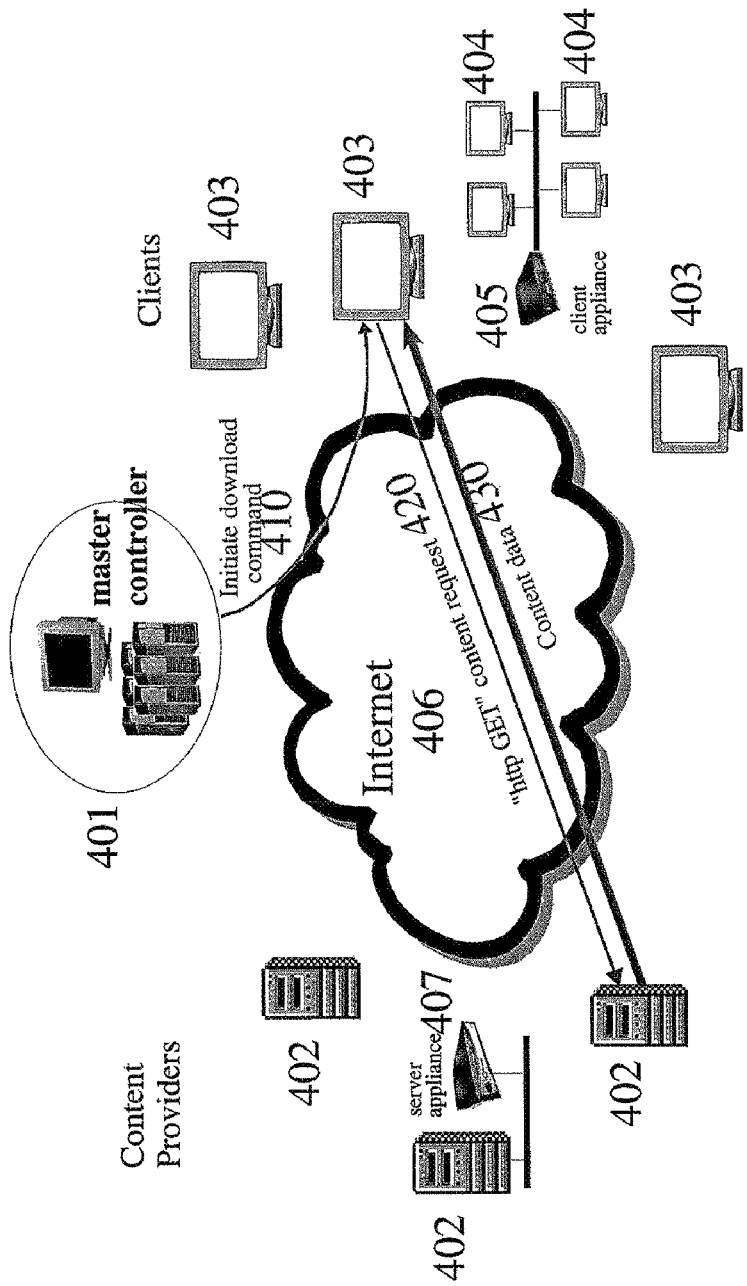

FIG. 4 is an alternative view of FIG. 2 illustrating the initiating of downloads directly from the server. Referring to FIG. 4, master controller 401 uses its knowledge of what content is available on content servers (as described in FIG. 2), and its knowledge of client profiles for different clients 403 and 404, to initiate downloads of content that will likely be needed in the future at clients 403 and 404. Master controller 401 sends messages 410 to clients 403 and client appliances 405 which contain commands to initiate downloads of content data from locations 402 specified in the messages 410. Clients 403 then send a message 420 to the content server 402 from which the content is to be downloaded. Content servers 402 then respond to these download requests 420 by returning the content data 430 to clients 403. Client appliances 405 retrieve content data from servers 402 in a similar manner.

Figure 5:
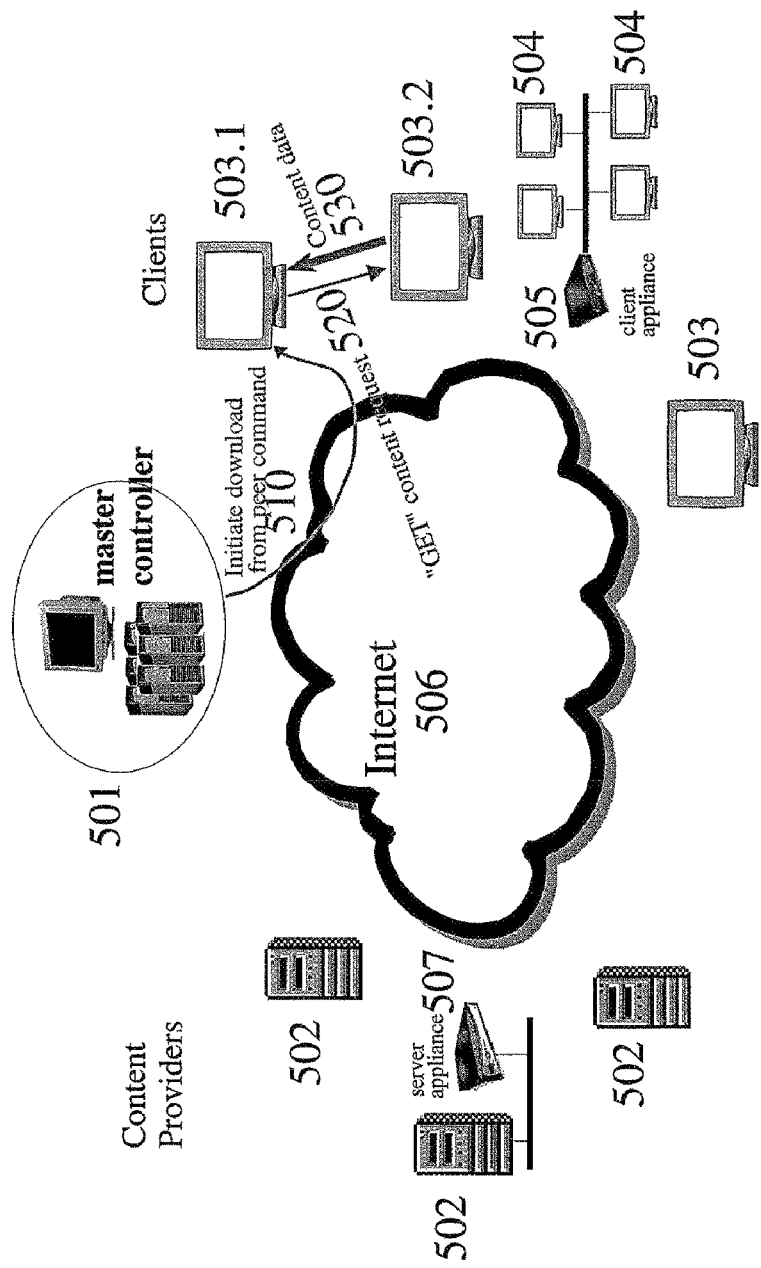

FIG. 5 is an alternative view of FIG. 2 illustrating initiating downloads from peers. Referring to FIG. 5, master controller 501 uses its knowledge of which clients 503 and client appliances 505 have already downloaded specific content objects to initiate downloads of content directly from a peer client. In one embodiment, master controller 501 sends a message 510 to client 503.1 to initiate download of a content object from peer client 503.2. Client 503.1 sends a message 520 to peer client 503.2 to retrieve the specified content. Client 503.2 then acts as a content server by responding to request 520 by sending the specified content data 530 directly back to client 503.1. In another embodiment, master controller 501 can send a command to a client to upload a specified content object to a specified peer client; this is useful when the client sending the content data cannot be directly contacted by the requesting client, perhaps because it resides behind a firewall. Client appliances 505 can get content from peer clients 503 and/or other client appliances in a similar manner.

In an alternate embodiment of the invention, clients 503 or client appliance 505 may directly query the master controller 501 for new content objects that match their local profiles, and receive from the master controller 501 a list of the new objects that are available, as well as their locations (e.g., content servers 502, peer clients 503, or peer client appliances 505). These queries may occur periodically or in response to some external event (e.g., a request from the master controller). Clients 503 or client appliances 505 can then select a suitable location to directly download the content from. In this embodiment, master controller 501 need not maintain profiles for all the clients, and messages 310 and 320 would be unnecessary.

In one embodiment, master controller 501 knows four things: 1) the content clients want based on profiles received from clients; 2) the new content that is available; 3) the location of the new content (e.g., servers, carrier edge caches, peers, etc.); and 4) network information such as, for example, network connectivity (e.g., network topology information, bandwidth, delay, and dynamically changing snapshots of network congestion and/or utilization). Using this information, master controller 501 schedules downloads of new content objects to clients 503 and client appliances 505. Such downloads may take the form of commands such as, for example, "get object from server 1" or may take the form of instructions such as, for example, "instruct client 2 to obtain the object from client 1". The network information and information about which downloads are taking place allow master controller 501 to do provisioning taking into account resource availability.

In one embodiment, master controller 501 is able to coordinate downloads so that prior to a download of content completing to a particular client, another download of that content may start occurring form that particular client. This kind of pipelining of downloads can significantly reduce the delay before a content object is replicated to a potentially very large number of clients and/or client appliances.

Clients 503 download content objects from the locations specified in messages 410 or 510 from the master controller. For example, in one embodiment, client 503 may download bandwidth intensive content such as, for example, movies, video, software, images, sound files, etc. Client 503 stores the content locally in one or more precache memories. The precache memory may be part of a client 503 (or is at least accessible by it over a fast link, for example, over a LAN). The content may be downloaded on the end user's premises. In one embodiment, the downloading occurs without excessive interference with any other interactive network traffic.

A user request may be generated (e.g., from a web browser) to download specific content from the network. Client software running on an end system can observe these requests. Alternately, a client appliance can observe such a request originating from an end system to which it is connected (e.g., through a LAN). Clients or client appliances monitoring these requests can detect when the request is for a content object that is in the local precache memory of the client or client appliance. If such a request is detected, clients or client appliances can intercept the request and satisfy the request by returning the stored (precached) content object from its local precache memory. If the request is for a content object that is not in the precache memory clients or client appliances can forward the request on to their original destination (e.g., content server, carrier-edge cache, etc.). Thus, requests for a specific type of bandwidth intensive content are intercepted. In one embodiment, clients and client appliances are configurable to intercept requests for a certain type of content object.

Thus, with content cached locally, clients and client appliances detect requests for embedded objects, check their precache memory to determine if the embedded objects are stored locally, and return the object from the precache memory if available. If the content is not available, the request is sent out into the network (e.g., Internet) to an appropriate location where the content or an alternate representation of the content may be found.

An Exemplary Protocol

Figure 6:
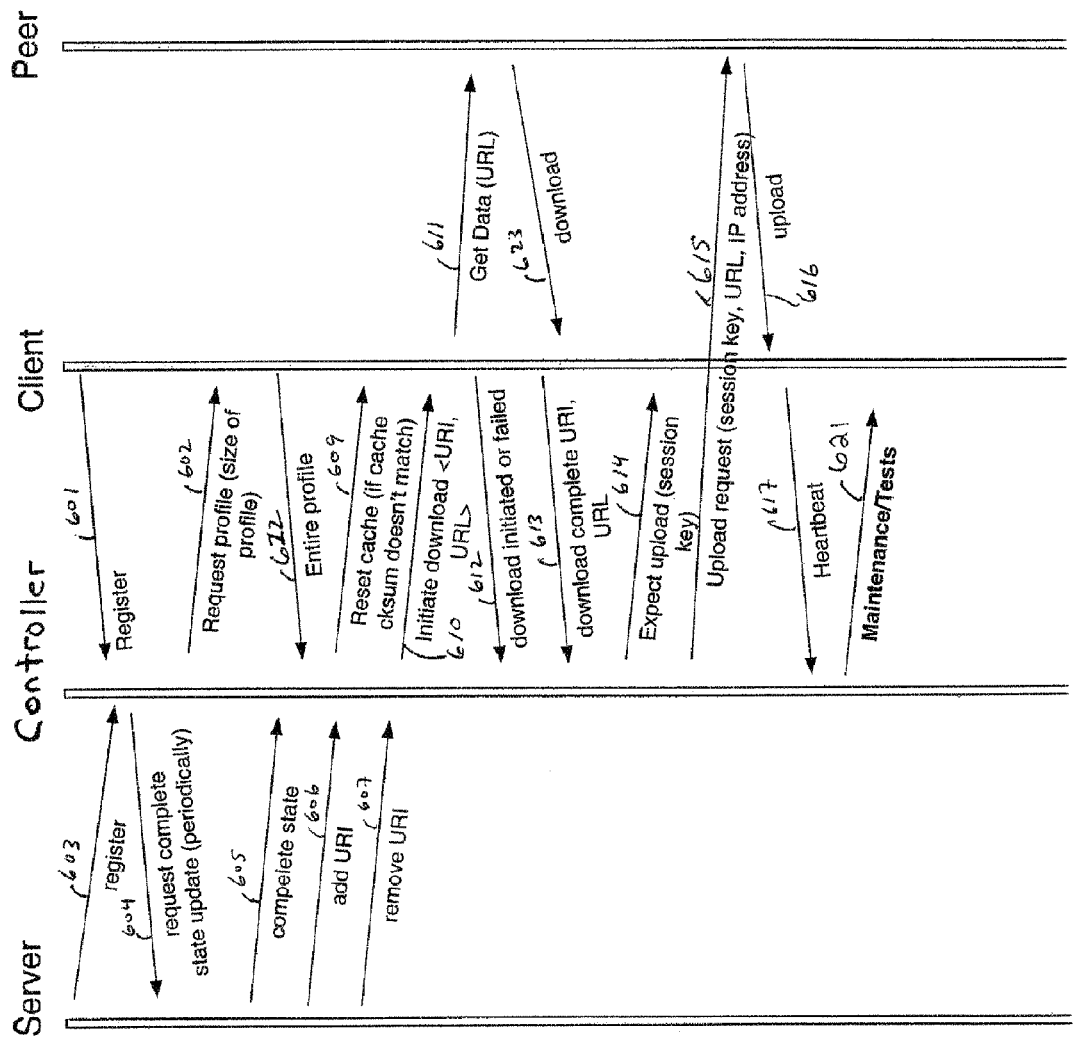
FIG. 6 is an exemplary protocol to facilitate precaching.

FIG. 6 illustrates one embodiment of a protocol for exchanging information between master controller 501 and a client, a server, and a peer. Referring to FIG. 6, initially, when the client first boots up, the client registers (601). Registration by the client involves sending information to enable master controller 501 to coordinate the precaching activity.

In one embodiment, once registration has been completed, all but one of the remaining operations are controlled from master controller 501 (e.g., in response to a NOC request or message). Thus, master controller 501 sends a request to which the client replies, with the exception of one situation.

After registration, master controller 501 requests the profile from the client (602). In one embodiment, master controller 501 indicates the size of the profile it is willing to accept or is able to accommodate. Then the client sends the profile to master controller 501 (622). In one embodiment, the profile is a list of links (e.g., 50 to 100 URLs) in order of access frequency, with links that are accessed more often being at the top of the profile. If the profile is larger than the maximum specified by master controller 501, the profile may be made smaller by the client by removing links that have been accessed less frequently (e.g., that are at the bottom of the list of links).

Similarly, master controller 501 communicates with the web servers (e.g., content providers). A server registers with master controller 501 (603). In response to the registration, master controller 501 requests state information from the server (604). This request may be generated by master controller 501 periodically while the server remains registered. In response to the request, the server sends state information (605). The state information may include a listing of all content objects that are linked through the sites. The list may be limited to only those content objects that are rich media objects or bandwidth intensive objects in terms of downloading. Every time new content is added or removed, the server sends an add message (606) or a remove message (607) to master controller 501 to update the list (e.g., in a database) master controller 501 maintains of the content objects linked through the site.

In one embodiment, master controller 501 initiates one or more maintenance tests on the client (621). These tests are well-known in the art. For example, master controller 501 can request traceroutes from this client to some other Internet address or a bandwidth test from the client to a different Internet address. Master controller 501 uses these tests to determine network connectivity and resource availability. With this information, master controller 501 is able to obtain information about the network topology, a network map, etc., as listed above. Note that such information may be provided to master controller 501 directly without the need of testing to discover it. At this point, master controller 501 has information about network topology, information about server size state, and information about clients.

In one embodiment, master controller 501 may send a reset cache message (609) if a cache checksum doesn't match a previously defined or calculated value.

Master controller 501 keeps track of where the content is. Specifically, master controller 501 keeps track of a particular content piece (e.g., video clips) and the identity of the servers and/or clients on which it is located. Occasionally, master controller 501 determines that a client is to download some object from a location and at this time, master controller 501 sends an initiate download message (610) to the client that identifies an object and the object's location. In one embodiment, the initiate download message includes the name of the object (e.g., universal resource identifier (URI) and its natural location (e.g., a URL corresponding to its location on the server of its origin, a URL corresponding to some peer client, etc.)).

In response to the download message, the client initiates the download by sending a get data command to a peer (611). After the peer begins to send the data (623), the client sends a message to master controller 501 indicating that the download has started (612). The download may take a while. Once the download has been completed, then the client sends a message to master controller 501 indicating that the download has been completed (613). This allows master controller 501 to know which downloads are occurring at any time.

In case the peer is behind a firewall, then the client cannot connect to the peer directly and download the data from behind the firewall. In that case, master controller 501 sends a message (615) directly to the peer to indicate that the peer is to upload the new content to the client. Master controller 501 also sends a message to the client to expect an upload (614) from some peer. A particular session key or number may be used to correlate uploaded information received by the client from other peer clients with the correct download identified by master controller 501. The peer sends the upload (616). Finally, the client sends a heartbeat message (617) to master controller 501 so that master controller 501 knows that the client is up in and running.

In one embodiment, the messages are small. Therefore, because almost all requests come from master controller 501, master controller 501 is able to schedule all the downloads to ensure that no single client or network link is being overloaded.

Building User Profiles

The client creates a profile for an end user that is coupled to the client. The profile may comprise a list of resource locators (e.g., URLs), object type, object size, and a time stamp associated with the URLs to provide information as to when the end user accessed the resource. In one embodiment, the profile comprises URLs and access times, identifying web sites or portions of web sites, and when the user tends to access them.

The client may build the user profile in a number of different ways. In one embodiment, a user profile may be developed based on the user's browsing patterns. The client tracks user's access patterns that may include tracking the web sites a user visits, the time a user accesses those sites, and/or the frequency of access may be identified and then used to define the user's browsing patterns. In one embodiment, combining this information with information about the average size of certain types of objects and the availability of bandwidth to any given site allows a determination to be made as to when to begin checking a site for new or updated content to ensure such content is available locally at the time it is likely to be accessed. If bandwidth is available (e.g., during the night), then the system (e.g., the master controller, client, etc.) can check for updates more frequently.

Profiles may be configured by, or built, using input from a network administrator or manager, such as master controller 501 in the NOC. For example, the master controller 501 could add or remove URLs and access times. To make a change to the profile, the client would be accessible via the network, such as by, for example, an Internet service provider (ISP), application service provider (ASP), or content provider, and the profile could be configured through that access. An example of its use might be where the ISP provides a service by which a video movie is provided once a day to an end user.

The individual could choose to watch the movie or not because the movie would have been already downloaded. Profiles may also be configured by a content server or a content provider.

Alternatively, the profile may be manually set by an individual, such as, for example, the user. The user may provide the specific URLs and access times manually to the profile. For example, if a user checks a set of web sites at a predetermined time during the day, the user can configure the network access gateway to access the web sites prior to that time each day to obtain updated or new content. Such additions to the profile augment the accuracy of the precaching.

A profile may be developed for a user using a combination of two or more of these profile building methods. Further priorities can be assigned to URLs stored in the precache memory in case of conflicting access times. In one embodiment, user configured URLs have priority over learned URLs (developed from tracking user access patterns) and network administrator configured URLs (e.g., from master controller 501).

Furthermore, priorities can be given to URLs in case of conflicting access times. For example, in one embodiment, user configured URLs can have priority over "learned" URLs generated from tracking user access patterns and externally configured URLs.

In one embodiment, only one precaching client is running on a system at any one time. An open application program interface (API) to the profile may be provided to allow third parties to add URLs to user profiles, to schedule downloads, and to use the services provided by the precaching architecture for their applications.

Locating New Content

In one embodiment, clients may check for new content by subscribing with master controller 501 in the NOC. Clients 503 can subscribe with master controller 501 to get automatic notification when new content becomes available. This is advantageous on large web sites with millions of clients because it reduces, or even minimizes, time and resources used in crawling.

Using the information stored in the user profiles, master controller 501 periodically checks for new content. To facilitate this, client 503 may have previously passed updates to its profile, such as shown as arrow 310 in FIG. 3. Master controller 510 maintains a list of web sites and their embedded media objects. This list is compiled by using updated information from content providers 502, such as, for example, shown as arrows 210 and 230 in FIG. 2, or by crawling web sites from the NOC, such as shown as arrow 240 in FIG. 2. The crawling process is similar to the way in which some Internet search engines create indices of web pages.

In one embodiment, content providers 502 support the system by periodically crawling locally all available web pages on their servers to look for new object content. This local crawl can be implemented by software, hardware or a combination of both.

The content providers 502 provide a summary of changes to master controller 501. Alternatively, such information may be provided directly to a client. The summary information may comprise the link, time, type and size of each object. The summary may include a list of URLs for those objects. The master controller compares the content in the list with the profile information (e.g., the list maintained by the network access gateway) to determine what content has changed and therefore what content, if any, is to be downloaded. In one embodiment, the result of the local crawl is made available in a special file, namely an update index. Master controller 501 analyzes the update index to find the new download candidates. In one embodiment, content providers 502 manually build an update index.

Master controller 501 collects and aggregates the summaries. In one embodiment, each content provider 502 sends the summary to master controller 501. In such a case, all the clients need only contact one server to download summary information for groups of participating content servers in-the network. In one embodiment, master controller 501 may unicast or multicast the information to one or more clients 503.

In an embodiment in which clients maintain their own profile, such as described in U.S. application Ser. No. 09/566,068, entitled "Intelligent Content Precaching," filed May 5, 2000, and issued as U.S. Pat. No. 6,917,960 assigned to the corporate assignee of the present invention and incorporated herein by reference, clients 503 directly crawl a web site and search for new content objects. Clients 503 perform a crawl operation by periodically checking web servers indicated in the profile for new or updated content objects that it believes end users or other local devices will be accessing in the near future. In one embodiment, in such a case, a client begins with a URL stored in the profile and follows links into web pages down to a configurable level.

In one embodiment, the controller obtains the first page from the server and determines if any bandwidth intensive objects are present. In one embodiment, a bandwidth intensive object may be identified by its size. If bandwidth intensive, embedded objects exist, the controller determines if new versions are available and 10 downloads them. When new content objects have been identified, the controller indicates to the client to download only the bandwidth intensive (e.g., large), new content objects (as they become available). The content objects obtained as a result of crawling are stored locally. In one embodiment, the precache memory storing such objects also stores their URLs, data type, size, the time when the data was acquired and 15 the actual data itself. This process is transparent to the network and no change is needed to the content servers or the network to operate the precaching client.

In an alternative embodiment, each new and/or updated content object is downloaded independent of size (after determining if the content object is a new version).

Some or all of these crawling techniques may be used in the same networked environment. For example, client 503 may crawl one or more sites to determine if any of the content objects have changed, while receiving information from master controller 501 or web servers employing a mechanism to crawl their sites to identify updated or new content and while caches in the network or content servers provide updated and new content to the client 503.

Downloading

Master controller 501 in the NOC maintains a database of available objects and their physical location. When a new object is available for downloading to client 503, master controller 501 determines the most suitable location from which client 503 may download the object. In one embodiment, master controller 501 does this by analyzing the database and the client's Internet protocol (IP) address, and relating this to network topology, map, and connectivity information known to it. A scheduler in the NOC returns a download trigger to client 503. The trigger provides information to enable client 503 to download the object. This trigger information, or pointer, may comprise a location and an object name (e.g., URL).

A requested object can be downloaded from a variety of sources, e.g. a peer, a carrier edge cache, or the original server. In FIG. 5, arrow 530 represents a download from a peer.

Management controller 501 determines the most suitable host based on parameters. In one embodiment, these parameters include peer-to-peer hop count and bandwidth.

If no suitable peer is available (e.g., if the request is the first request for an object or if suitable peers are too far away), the object can also be downloaded from a server installed on the carrier edge if the content provider supports carrier edge caching. If there is no suitable peer and no cache can be found, the object is downloaded from the original content provider server 502. Client 503 downloads the object in the background without excessively interfering with interactive traffic, regardless of the location from which it downloads.

Intercept

In one embodiment, client 503 transparently analyzes the web pages downloaded by the end users and rewrites embedded URLs in web pages to point to the locally precached object instead of the original object. In rewriting URLs, specific marks (e.g. a different link color or an additional icon) for objects available in the precache can be added. When the user finally selects (e.g., clicks) on a link, the browser automatically loads the object from the precache instead of the content provider server.

Client 503 may intercept requests for content objects in different ways. For example, in one embodiment, client 503 monitors requests and when there is a request for a content object stored by (or for access by) client 503, it takes the request and responds to the request as if it were originally addressed for client 503. Thus, an end user generating the request receives the content object as if it had received the content from the original server hosting the content. This is one example of an implicit way to translate an access for a content object to a locally cached object. The interception-of requests may be done explicitly where an end system is aware of the new location of the object (e.g., through DNS lookup). In one embodiment, client 503 checks for certain types of requests, which correspond to content available in the precache memory (e.g., all *.mov files). If such a request is detected, the client searches the precache memory for the requested URL.

Applications

The peer-to-peer precaching technique facilitates provision of premium services, such as explicit downloads, mapped content, aggregated access statistics, etc. The premium service of explicit downloads is done by installing triggers to pull the customer's content (e.g., all new clips on a web site immediately go to all sites with the web site's URL in their profiles).

Mapped content allows customers to offer dense content dedicated to precache-enabled users. In one embodiment, this is implemented by offering a separate high resolution file of a video clip which is not linked into any web page, but is available to the master controller when it checks a target web site for new content. When the user clicks on a video icon on a web page, the transparent precache technology delivers the high resolution version instead of the potentially low resolution version.

In aggregated access statistics, access statistics and user profile statistics are provided to content providers and distributors. For example, individual user access profiles on the customer premises are retained, with the statistics being reported. By only reporting the aggregated statistics, privacy concerns are avoided.

Besides enhancing traditional web sites with high-quality video, the precaching technique can be applied in other areas, such as advertising, and DVD on demand. Running decent quality video advertising over the Internet has not been possible so far. A broadband connection can barely deliver a single low-quality video stream, and consumers would certainly not want video ads to eat up their interactive bandwidth. Thus, advertisers are currently limited to using "banner ads," which are mostly implemented as blinking images (animated GIFs). With precaching, advertisements can be downloaded while the link is not used otherwise. Thus, full motion ads can be downloaded in the background, and embedded in web pages, without exhausting the interactive bandwidth. The peer-to-peer video precaching technique helps advertisers to succeed in their hunt for eye balls. In addition, the precaching technique allows the advertisers and content providers to retain their ability to keep track of the number of "hits" of the embedded ads.

The precaching technique also makes online distribution of DVD video feasible. The hassle with late fees, midnight video store runs and rewinding charges would be avoided using an online renting model. MPEG2 video, the coding standard used on DVDs, requires an average bandwidth of 3.7 Mbits/sec. The average length of a DVD movie is two hours. An average movie needs approximately 3.5 Gbytes of disk space. Over a 500 kbits/sec Internet connection, three hours of DVD-quality movie can be downloaded in 24 hours. If the connection is twice as fast (e.g., 1 Mbit/sec), three full DVD movies can be delivered over the Internet in a day.

Thus, a technique of personalized content delivery using peer-to-peer precaching has been described. In particular, this technique saves content providers bandwidth on their server farms and carrier edge caches. It also improves the interactive experience of a large number of web sites. While the previous discussion focuses on clients running on end system PCs, the technique can be implemented to run in access gateways, home gateways, set-top boxes, etc.

An Exemplary Computer System

Figure 7:
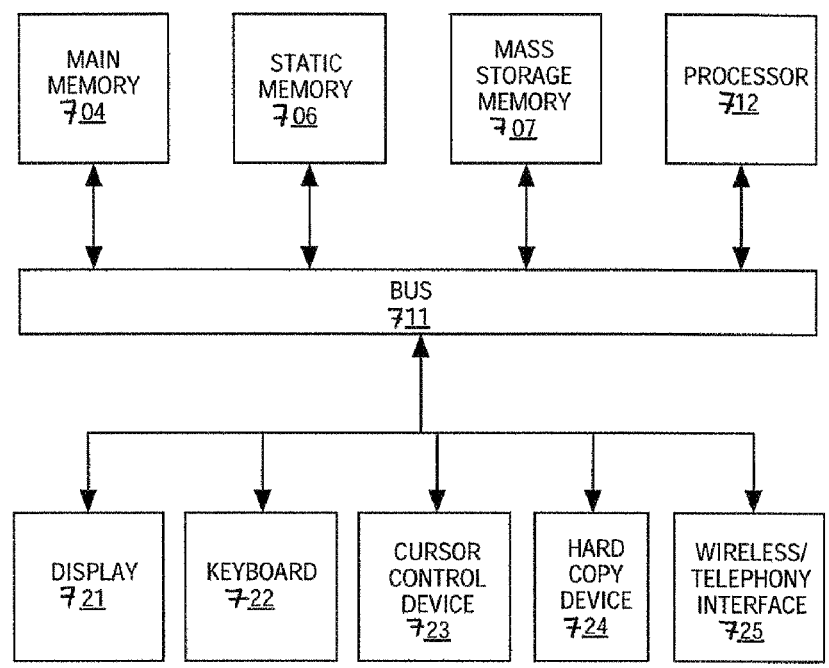
FIG. 7 is a block diagram of one embodiment of a computer system.

FIG. 7 is a block diagram of an exemplary computer system (e.g., PC, workstation, etc.). Referring to FIG. 7, computer system 700 may comprise an exemplary client 503 or server 502 computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, PowerPC™, Alpha™, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for printing instructions, data, or other information on a medium such as paper, film, or similar types of media. Furthermore, a sound recording and playback device, such as a speaker and/or microphone may optionally be coupled to bus 711 for audio interfacing with computer system 700. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method for delivering by a controller a content object to a client for precaching, the method comprising the steps of:
   (a) receiving from a client, by a controller, a profile maintained by the client, the client comprising an end node of a local network and having a browser operated by the user, the profile identifying a resource that may be requested by the user based on previous access patterns of the user via the client;
   (b) determining, by the controller, that a content object stored on a content server corresponds to the resource identified by the profile; and
   (c) transmitting, by the controller, to the client a message comprising a command that the client executes to download the content object from a location identified by the message.

2. The method of claim 1, comprising scheduling, by the controller, a download of the content object to the client based on network information.

3. The method of claim 2, comprising determining, by the controller, the schedule for downloading the content object based on one or more of the following network information: network topology, bandwidth, delay, congestion and utilization.

4. The method of claim 1, wherein step (b) comprises searching, by the controller, a database of profiles to determine a set of one or more clients having profiles corresponding to the content object.

5. The method of claim 1, wherein step (c) comprises transmitting, by the controller, the message to the client according to a download schedule.

6. The method of claim 1, transmitting, by the client, a request to download the content object from the location, and storing, by the client, the downloaded content object to a cache.

7. The method of claim 6, comprising intercepting, by the client, a request for the content object, and responding to the request with the downloaded content object from the cache.

8. The method of claim 1, wherein step (c) comprises transmitting, by the controller, the request prior to the user requesting the content object from the content server.

9. The method of claim 1, wherein step (a) comprises transmitting, by one of the client or a client appliance, the profile to the controller.

10. The method of claim 1, comprising crawling, by the controller, content of the content server to identify the content object.

11. The method of claim 1, comprising receiving, by the controller, a report from the content server identifying the content object.

12. The method of claim 1, comprising crawling, by a server appliance, content of the content server, and reporting, by the server appliance, to the controller the content object.

13. The method of claim 1, intercepting, by the controller, a request for the content object from a second client to the content server on a wide area network (WAN), and transmitting, by the controller, a second message to the second client to download the content object from the first client.

14. The method of claim 13, comprising requesting, by the second client, the content object from the client.

15. The method of claim 1, wherein the location comprises one of the content server on a wide area network (WAN), the controller, a client appliance, or a second client.

16. The method of claim 1, comprising building the profile by identifying user access patterns.

17. The method of claim 1, comprising configuring, by the user, the profile.

18. The method of claim 1, comprising maintaining, by a client appliance, the profile of the client on the local network, and reporting the profile to the controller.

19. The method of claim 1, comprising querying, by the client or a client appliance, the controller for any new content objects corresponding to the profile.

20. The method of claim 1, comprising identifying the resource via the profile by using one or more of the following: a uniform resource identifier, a uniform resource locator, an object type, an object size, a time stamp associated with a uniform resource locator, and a frequency of access.

21. A controller device for delivering a content object to a client for precaching, the controller device comprising:
   a memory; and
   a processor configured to receive from a client a profile maintained by the client, the client comprising an end node of a local network and having a browser operated by the user, the profile identifying a resource that may be requested by the user based on previous access patterns of the user via the client;
   wherein the processor is configured to determine that a content object stored on a content server corresponds to the resource identified by the profile; and
   wherein the processor is configured to transmit to the client a message comprising a command that the client executes to download the content object from a location identified by the message.

22. The controller device of claim 21, wherein the processor further configured to schedule a download of the content object to the client based on network information.

23. The controller device of claim 22, wherein the processor is further configured to determine a schedule for downloading the content object based on one or more of the following network information: network topology, bandwidth, delay, congestion and utilization.

24. The controller device of claim 21, wherein the processor is further configured to search a database of profiles to determine a set of one or more clients having profiles corresponding to the content object.

25. The controller device of claim 21, wherein the processor is further configured to transmit the message to the client according to a download schedule.

26. The controller device of claim 21, wherein the processor is further configured to transmit a request to download the content object from the location, and storing, by the client, the downloaded content object to a cache.

27. The controller device of claim 26, wherein the processor is further configured to intercept a request for the content object, and responding to the request with the downloaded content object from the cache.

28. The controller device of claim 21, wherein the processor is further configured to transmit the request prior to the user requesting the content object from the content server.

29. The controller device of claim 21, wherein the processor is further configured to crawl content of the content server to identify the one or more content objects.

30. The controller device of claim 21, wherein the processor is further configured to receive a report from the content server identifying the content object.

31. The controller device of claim 21, wherein the processor is further configured to receive from a server appliance a report identifying the content object, the server appliance crawling content of the content server.

32. The controller device of claim 21, wherein the processor is further configured to intercept a request for the content object from a second client to the content server on a wide area network (WAN), and transmitting a second message to the second client to download the content object from the first client.

33. The controller device of claim 21, wherein the location comprises one of a content server on a wide area network (WAN), the controller, a client appliance, or a second client.

34. The controller device of claim 21, wherein the processor is further configured to receive from one of a client or a client appliance a query for any new content objects corresponding to the profile.

35. The controller device of claim 21, wherein the profile comprises one or more of the following: a uniform resource identifier, an object type, an object size, a time stamp associated with a uniform resource locator, and a frequency of access.

* * * * *